(12) United States Patent
Nagamine et al.

(10) Patent No.: US 9,264,746 B2
(45) Date of Patent: Feb. 16, 2016

(54) CONTENT DISTRIBUTION SYSTEM, CONTENT DISTRIBUTION SERVER, CONTENT DISTRIBUTION METHOD, SOFTWARE PROGRAM, AND STORAGE MEDIUM

(75) Inventors: Shoh Nagamine, Kanagawa (JP); Hiroshi Baba, Kanagawa (JP); Shinsuke Yanazume, Kanagawa (JP); Hiroki Ozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 977 days.

(21) Appl. No.: 13/409,727

(22) Filed: Mar. 1, 2012

(65) Prior Publication Data
US 2013/0060925 A1 Mar. 7, 2013

(30) Foreign Application Priority Data

Sep. 3, 2011 (JP) ................................ 2011-051747

(51) Int. Cl.
| | |
|---|---|
| G06F 15/173 | (2006.01) |
| G06F 15/16 | (2006.01) |
| H04N 21/2343 | (2011.01) |
| H04N 21/239 | (2011.01) |
| H04N 21/258 | (2011.01) |
| G06F 21/10 | (2013.01) |

(52) U.S. Cl.
CPC .......... *H04N 21/23439* (2013.01); *G06F 21/10* (2013.01); *H04N 21/2393* (2013.01); *H04N 21/25808* (2013.01)

(58) Field of Classification Search
None
See application file for complete search history.

(56) References Cited

U.S. PATENT DOCUMENTS

| | | |
|---|---|---|
| 2006/0079175 A1 | 4/2006 | Choi |
| 2008/0129888 A1 | 6/2008 | Zuo et al. |
| 2008/0260161 A1* | 10/2008 | Yokota et al. ................. 380/278 |
| 2009/0034723 A1 | 2/2009 | Yanazume |
| 2009/0253506 A1* | 10/2009 | Ishii et al. ....................... 463/31 |

FOREIGN PATENT DOCUMENTS

| | | |
|---|---|---|
| CN | 1747486 A | 3/2006 |
| CN | 1809077 A | 7/2006 |
| JP | 2002-342218 | 11/2002 |
| JP | 2010-61212 | 3/2010 |

OTHER PUBLICATIONS

Chinese Office Action issued Mar. 5, 2014, in China Patent Application No. 201210061891.2.

* cited by examiner

*Primary Examiner* — Azizul Choudhury
(74) *Attorney, Agent, or Firm* — Oblon, McClelland, Maier & Neustadt, L.L.P.

(57) ABSTRACT

A content distribution system includes a terminal device, and a content distribution server connectable to the terminal device. The content distribution server includes a capability information obtaining unit to obtain capability information of the terminal device that requests a target content; an element extraction unit to obtain the requested target content and to extract a sub-content element composing the target content; a comparison unit to identify a sub-content element that can be used at the terminal device based on the capability information, and to compare the identified sub-content element based on the capability information and the extracted sub-content element to determine which sub-content element can be used at the terminal device; an output determination unit to determine whether separation of the target content is required to distribute the sub-content element to the terminal device; and a separating unit to separate the target content into sub-content element if separation is required.

21 Claims, 15 Drawing Sheets

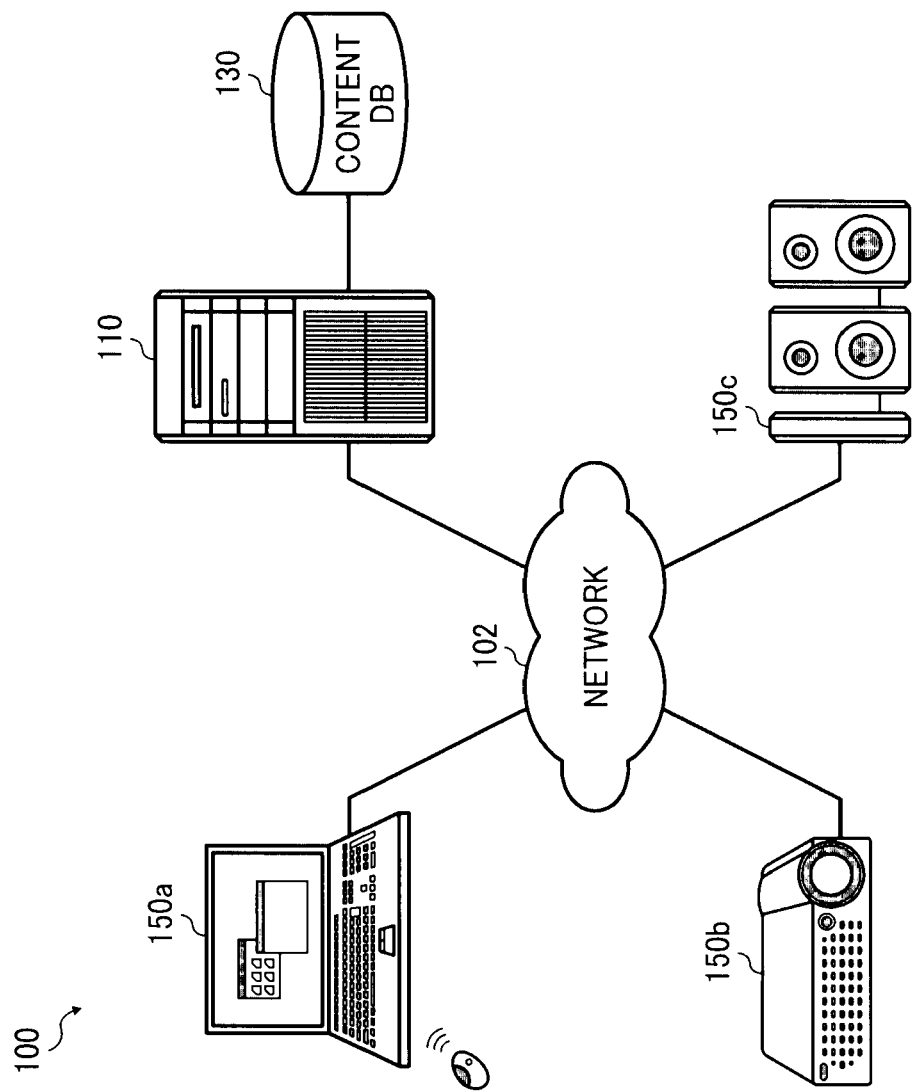

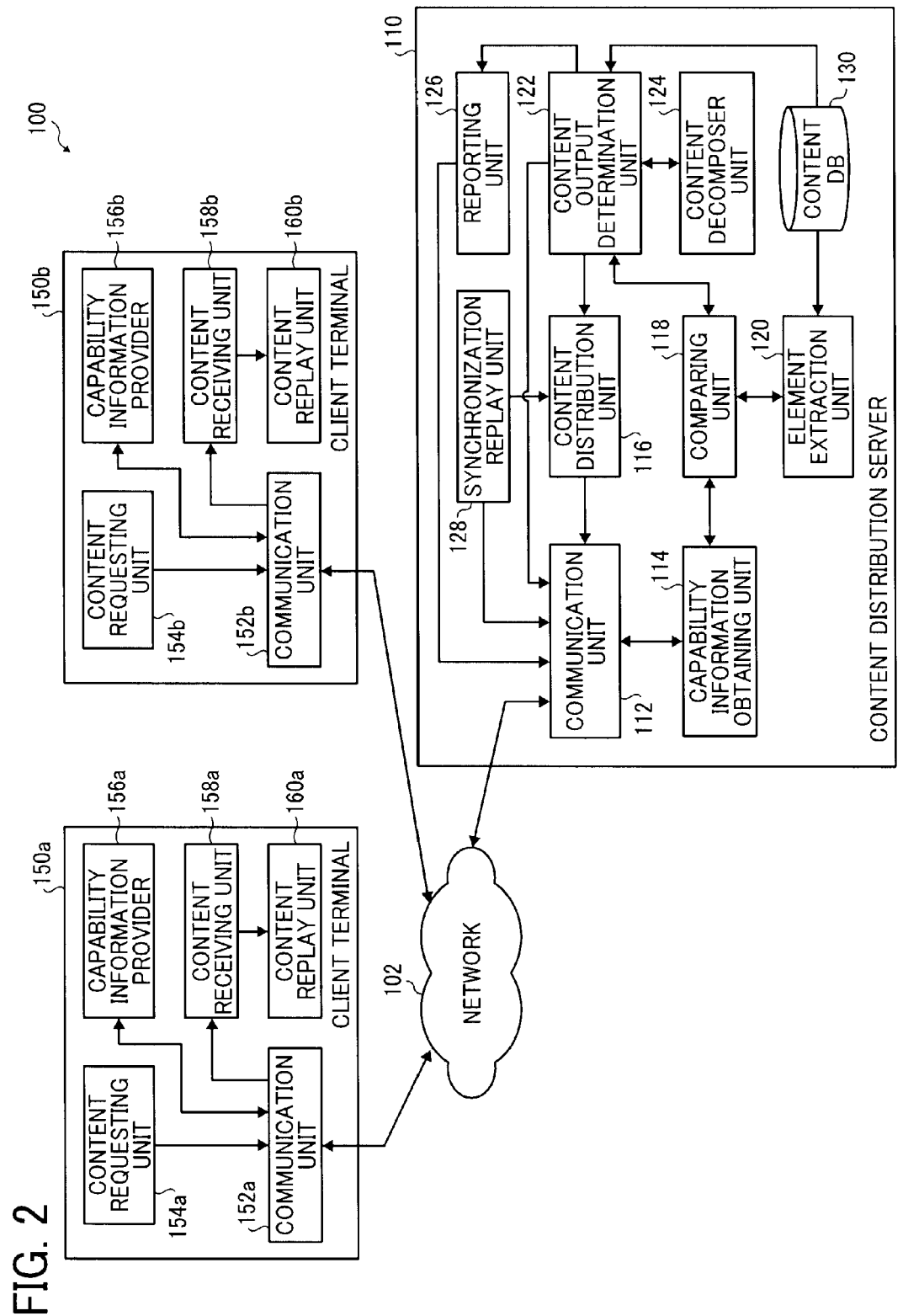

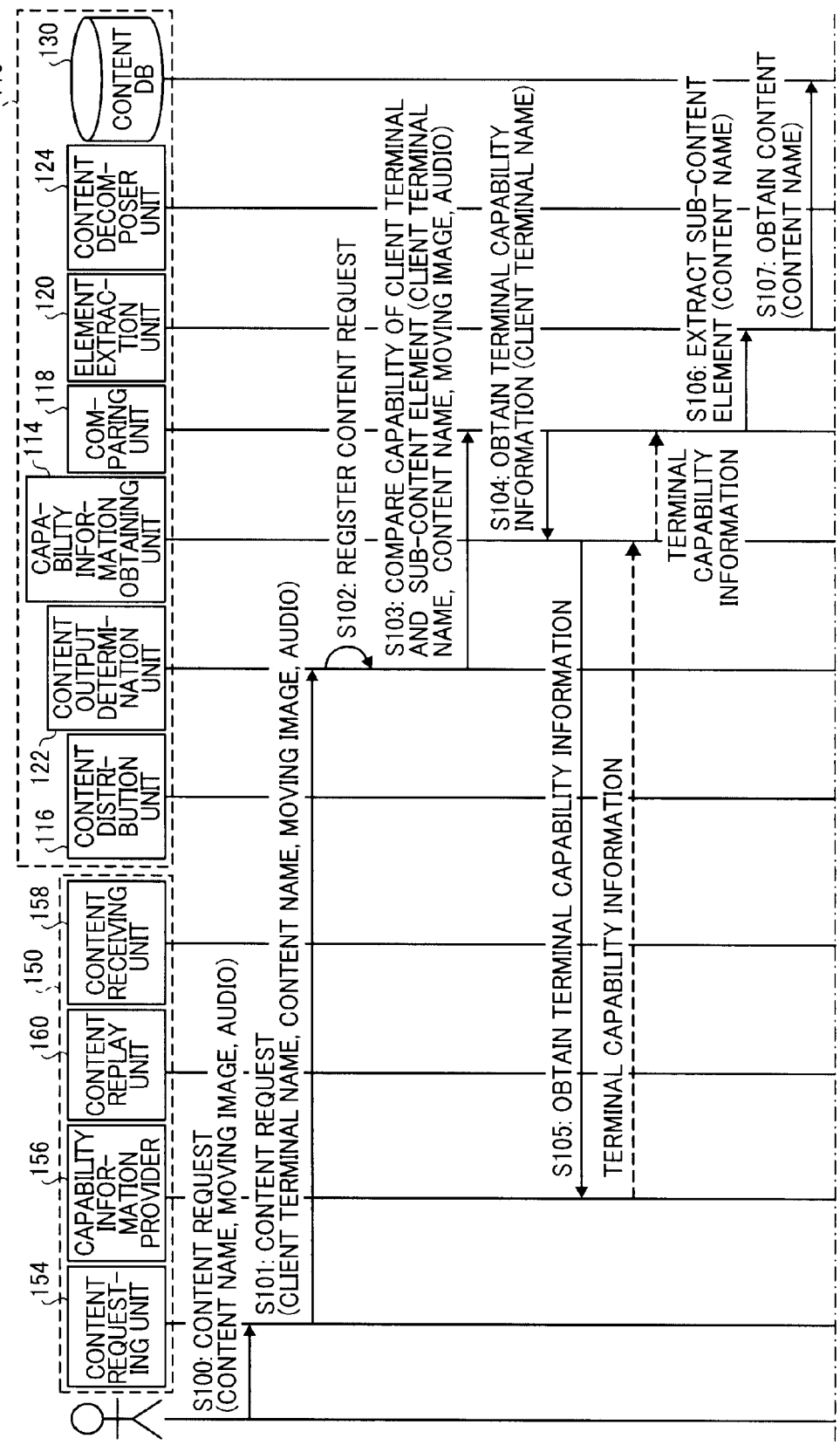

FIG. 5A

| CLIENT TERMINAL INFORMATION | CONTENT NAME | SUB-CONTENT ELEMENT |
|---|---|---|
| PROJECTOR xxx.xxx.xxx.xxx | Sample1.mgp | MOVING IMAGE, AUDIO |
| EARPHONE xxx.xxx.xxx.xxx | Sample1.mgp | AUDIO |
| ⋮ | ⋮ | ⋮ |

FIG. 5B

- avi
- mpg
- mp4
- wmv
- mp3
- wav

FIG. 5C

- H.263
- H.264/MPEG-4 Part 10 or AVC
- DivX
- Motion JPEG
- G.729
- MPEG-1 or MPEG-2 Audio Layer 3

FIG. 5D

- Video Projector Device
- Audio Device

FIG. 6

| FORMAT IDENTIFICATION INFORMATION | RELATED SUB-CONTENT ELEMENT |
|---|---|
| extension: avi | MOVING IMAGE + AUDIO |
| extension: mpg | MOVING IMAGE + AUDIO |
| extension: mp4 | MOVING IMAGE + AUDIO |
| extension: wmv | AUDIO |
| extension: mp3 | AUDIO |
| extension: wav | AUDIO |
| extension: jpeg | STILL IMAGE |
| extension: gif | STILL IMAGE |
| ⋮ | ⋮ |
| codec: H.263 | MOVING IMAGE + AUDIO |
| codec: H.264/MPEG-4 Part 10 or AVC | MOVING IMAGE + AUDIO |
| codec: Motion IPEG | MOVING IMAGE + AUDIO |
| codec: G.729 | AUDIO |
| codec: MPEG-1 Audio Layer 3 | AUDIO |
| ⋮ | ⋮ |
| device: Video Projector Device | MOVING IMAGE |
| device: Audio Device | AUDIO |
| ⋮ | ⋮ |

FIG. 9A

| CLIENT TERMINAL INFORMATION | MOVING IMAGE OF Sample1.mpg | AUDIO OF Sample1.mpg |
|---|---|---|
| PROJECTOR xxx.xxx.xxx.xxx | CAN PLAY | CAN PLAY |

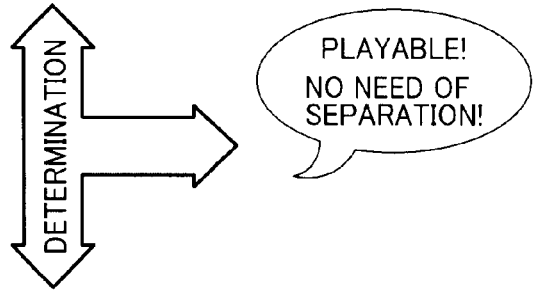

PLAYABLE! NO NEED OF SEPARATION!

| CLIENT TERMINAL INFORMATION | CONTENT NAME | SUB-CONTENT ELEMENT |
|---|---|---|
| PROJECTOR xxx.xxx.xxx.xxx | Sample1.mpg | MOVING IMAGE, AUDIO |

FIG. 9B

| CLIENT TERMINAL INFORMATION | MOVING IMAGE OF Sample1.mpg | AUDIO OF Sample1.mpg |
|---|---|---|
| EARPHONE xxx.xxx.xxx.xxx | CANNOT PLAY | CAN PLAY |

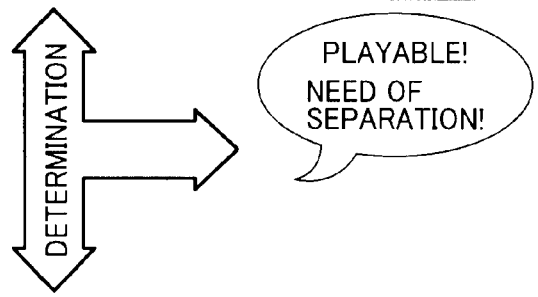

PLAYABLE! NEED OF SEPARATION!

| CLIENT TERMINAL INFORMATION | CONTENT NAME | SUB-CONTENT ELEMENT |
|---|---|---|
| EARPHONE xxx.xxx.xxx.xxx | Sample1.mpg | AUDIO |

| CLIENT TERMINAL INFORMATION | MOVING IMAGE OF Sample1.mpg | AUDIO OF Sample1.mpg |
|---|---|---|
| PROJECTOR xxx.xxx.xxx.xxx | CAN PLAY | CANNOT PLAY |

NOT-PLAYABLE ELEMENT IS DETECTED! NEED OF SEPARATION!

| CLIENT TERMINAL INFORMATION | CONTENT NAME | SUB-CONTENT ELEMENT |
|---|---|---|
| PROJECTOR xxx.xxx.xxx.xxx | Sample1.mpg | MOVING IMAGE, AUDIO |

FIG. 13

| TYPES OF CONTENT | | | | |
|---|---|---|---|---|
| MOVIE | SEPARATED SUB-CONTENT ELEMENT | MOVING IMAGE | AUDIO | |
| | TERMINAL TO REQUEST REPLAY | PROJECTOR | EARPHONE | |
| MOVIE | SEPARATED SUB-CONTENT ELEMENT | STILL IMAGE | AUDIO | |
| | TERMINAL TO REQUEST REPLAY | DIGITAL PHOTO FRAME | | |
| MOVIE | SEPARATED SUB-CONTENT ELEMENT | MOVING IMAGE | AUDIO | CAPTURE INFORMATION |
| | TERMINAL TO REQUEST REPLAY | PROJECTOR | | PC |
| MOVIE | SEPARATED SUB-CONTENT ELEMENT | MOVING IMAGE | AUDIO | AUDIO |
| | TERMINAL TO REQUEST REPLAY | PROJECTOR | | SPEAKER |
| AUDIO | SEPARATED SUB-CONTENT ELEMENT | AUDIO | TEXT INFORMATION OF AUDIO | |
| | TERMINAL TO REQUEST REPLAY | MUSIC PLAYER | SMART PHONE | |
| WEB PAGE | SEPARATED SUB-CONTENT ELEMENT | STILL IMAGE | TEXT | |
| | TERMINAL TO REQUEST REPLAY | TERMINAL NOT HAVING BROWSER | | |

CONTENT DISTRIBUTION SYSTEM, CONTENT DISTRIBUTION SERVER, CONTENT DISTRIBUTION METHOD, SOFTWARE PROGRAM, AND STORAGE MEDIUM

CROSS-REFERENCE TO RELATED APPLICATION

This application claims priority to Japanese Patent Application No. 2011-051747, filed on Mar. 9, 2011 in the Japan Patent Office, which is incorporated by reference herein in its entirety.

BACKGROUND

1. Technical Field

The present invention relates to a content distribution technology, and more particularly to a content distribution system, a content distribution server, a content distribution method, a software program, and a storage medium storing the software program to convert content to a format suitable for a client terminal.

2. Description of the Background Art

With the spread of the Internet and multimedia technology, information can now be transmitted various ways, including simple text data exchange using e-mail, uploading of multi-media content composed of audio/sound, moving images, and still image via a network, and downloading of multi-media content via the network for viewing and listening.

However, different users downloading content typically have different client terminals. In view of this difference in client terminal environments, when content is to be used at each client terminal via a network, the format of the content may need to be converted for each client terminal. For example, a format conversion server on a network converts the format of the content to one that is suitable for the client terminal in view of the format of the client terminal.

JP-2002-342218-A discloses a system using a format conversion server disposed on a network, in which the format conversion server converts the format of content suitable for a client terminal in view of the format of the client terminal such as displayable resolution level, types of colors, and frequency range playable by a speaker. The format conversion server provides the format-converted content to the client terminal via the network. The system includes a client terminal, a server to accumulate content (content accumulation server), and a server to convert content into a format usable at each client terminal (format conversion server) connected via a network. The format conversion server refers to a profile specifying the replay capability and display capability for content at each client terminal, wherein the profile is prepared at the concerned client terminal, to determine a format suitable for the concerned client terminal. After converting the format of the content received from the content accumulation server, the format conversion server transmits the format-converted content to a content providing unit, from which the format-converted content is transmitted to the concerned client terminal.

Further, JP-2010-061212-A discloses a data distribution technology using an input apparatus and a plurality of data distribution apparatuses. The input apparatus instructs a first data distribution apparatus to start data distribution (distribution start step). The first data distribution apparatus selects a data distribution apparatus that actually conducts the data distribution based on processing capacity of the first data distribution apparatus and processing load of all data distribution apparatuses (distribution apparatus selection step). For example, a second data distribution apparatus can be selected as the data distribution apparatus that actually conducts the data distribution based on the selection result. The second data distribution apparatus receives document data obtained by the input apparatus, converts the format of document data, if required, and distributes the document data (data distribution step).

However, the approaches described in JP-2002-342218-A and JP-2010-061212-A may not be effective for converting the content format into a format suitable for each client terminal and then providing the format-converted content.

For example, the conventional data distribution system described above may not be effective in the following environment. When movie content stored in a server is being projected on a screen provided with a speaker in a large conference room, audio/sound is output from the speaker. In such large conference room, a participant may be sitting at a position where he or she cannot clearly hear the audio/sound of content from his or her seat position. In such a situation, the concerned participant may connect his or her personal terminal device to the data distribution system so that the audio/sound can be received and output at his or her personal terminal device.

In this case, the user needs only audio/sound of the movie content at his or her terminal. But the conventional data distribution system may not be adapted to output only audio/sound to the concerned client terminal. Further, other than such audio/sound receiving terminal, other users may want to connect a terminal having a viewing/listening capability, or a bone-conduction earphone for hearing-impaired participants, to the data distribution system.

Further, the conventional art may not be adapted for collaborative output of content stored on a server. In such collaborative output of content, multi-media content such as movie content composed of a plurality of different types of content can be replayed as follows: one client terminal is used for outputting moving images and other client terminal is used for outputting audio/sound (i.e., separation of functions). Such collaborative output of content can devise a suitable outputting mode for a system by using a plurality of client terminals to output each type of content included one multi-media content.

Further, conventional systems may not be adapted for adding a client terminal as an output destination after replay of content has been started. For example, when the content has been replayed for some time, a user wants to connect his or her personal terminal to a system to receive and output audio/sound of the content at his or her personal terminal, but the conventional system may not be adapted for such dynamic adding of output destination.

As such, in the conventional art, only the format conversion of the entire content can be conducted for a client terminal.

SUMMARY

In one aspect of the present invention, a content distribution system is devised. The content distribution system includes a terminal device, and a content distribution server connectable to the terminal device via a network. The content distribution server includes a capability information obtaining unit to obtain capability information specifying one or more capabilities of the terminal device that requests use of a target content as a content-use request; an element extraction unit to obtain the requested target content from a content storage unit and to extract a sub-content element composing the target content; a comparison unit to identify a sub-content element that can be used at the terminal device based on the capability information, and to compare the identified sub-content element based on the capability information and the extracted sub-content element to determine which sub-content element can be used at the terminal device; an output determination unit to determine whether separation of the target content is required to distribute the sub-content element that can be used at the terminal device to the terminal device; and a separating unit to separate the target content into each sub-content element as a separated sub-content element if separation of the target content is required.

In another aspect of the present invention, a content distribution server connectable to a terminal device via a network is devised. The content distribution server includes a capability information obtaining unit to obtain capability information specifying one or more capabilities of the terminal device that requests use of a target content; an element extraction unit to obtain the requested target content from a content storage unit and to extract a sub-content element composing the target content; a comparison unit to identify a sub-content element that can be used at the terminal device based on the capability information, and to compare the identified sub-content element based on the capability information and the extracted sub-content element to determine which sub-content element can be used at the terminal device; an output determination unit to determine whether a separation of the target content is required to distribute the sub-content element that can be used at the terminal device to the terminal device; and a separating unit to separate the target content into each sub-content element as a separated sub-content element if the separation of the target content is required.

In another aspect of the present invention, a non-transitory computer readable medium storing a program for a content distribution method conductable by a content distribution server connectable to a terminal device via a network is devised. The method includes the steps of a) obtaining capability information specifying one or more capabilities of the terminal device that requests a use of a target content; b) obtaining the requested target content from a content storage unit; c) extracting a sub-content element composing the target content; d) identifying a sub-content element that can be used at the terminal device based on the capability information; e) comparing the identified sub-content element based on the capability information and the extracted sub-content element to determine which sub-content element can be used at the terminal device; f) determining whether separation of the target content is required to distribute the sub-content element that can be used at the terminal device to the terminal device; and g) separating the target content into each sub-content element as a separated sub-content element if separation of the target content is required.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 shows a schematic network environment of a content distribution system according to an example embodiment;

FIG. 2 shows a block diagram of the content distribution system according to an example embodiment;

FIGS. 3A and 3B show an example sequential chart of content distribution processing according to an example embodiment, in which it is determined that a separation of content is not required;

FIG. 5A shows an example of replay requesting data, and FIGS. 5B, 5C, and 5D show examples of data structure of terminal capability information;

FIG. 6 shows an example of data structure of relational table;

FIGS. 9A and 9B show examples of determination results determined by a content output determination unit according to an example embodiment;

FIG. 13 shows example cases of content replay patterns of the content distribution system according to an example embodiment.

Figure 3B:
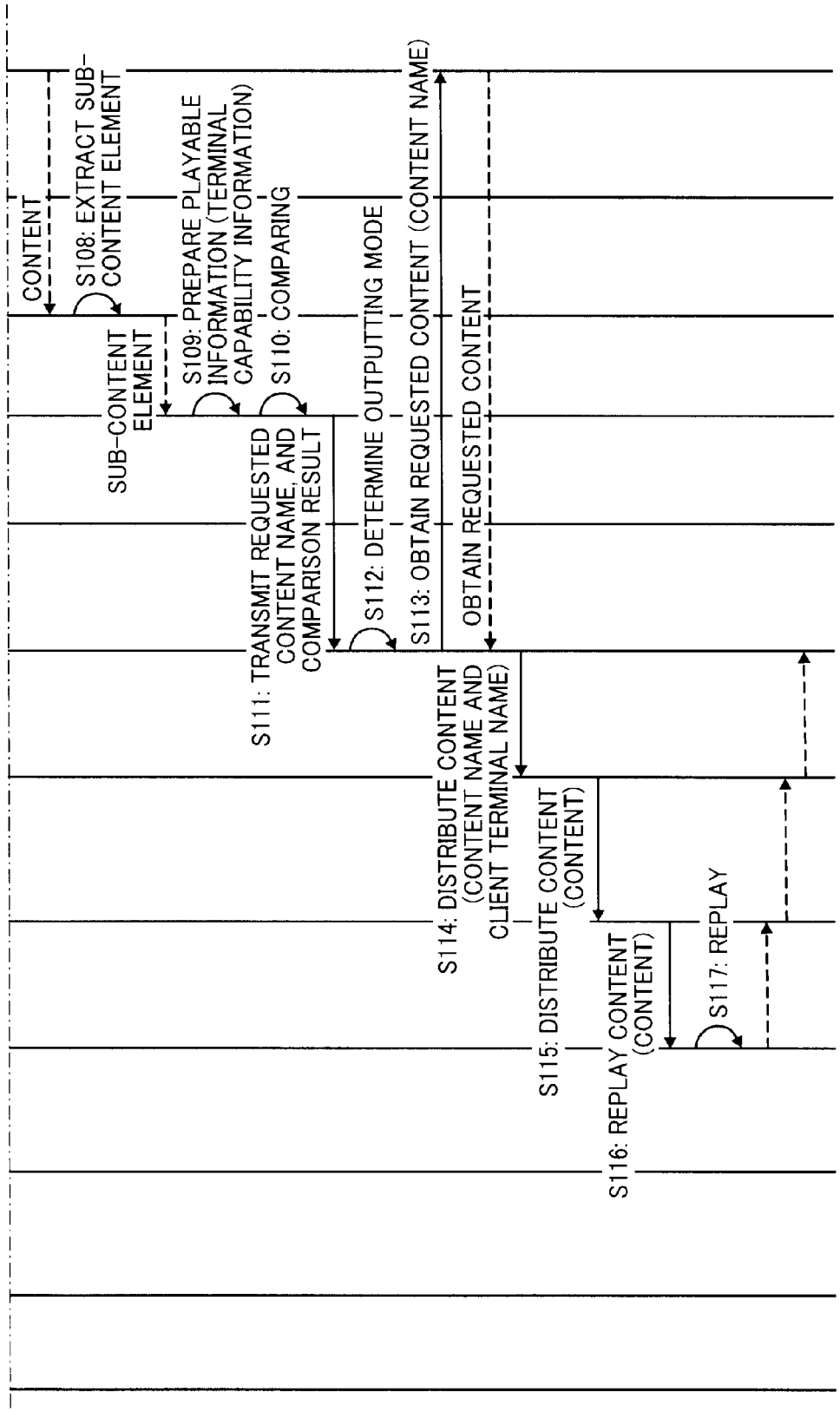

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referencing now to the drawings, an apparatus or system such as a content distribution server, system, method, and program of content distribution method according to an example embodiment is described hereinafter.

FIG. 1 shows a schematic network environment for implementing a content distribution system 100 according to an example embodiment. The content distribution system 100 may be configured with a content distribution server 110 and a plurality of client terminals 150, which can be connectable to each other via a network 102. Each client terminal 150 can be used as a terminal device or apparatus.

The network 102 is not limited to any specific network. For example, the network 102 may be Ethernet (registered trademark), a local area network (LAN) or a virtual private network (VPN) using a transaction protocol such as transmission control protocol/internet protocol (TCP/IP), a wide area network (WAN) or the Internet using a specific communication line, a device network using universal serial bus (USB) or Bluetooth (registered trademark), a personal area network, or the like. The network 102 can be a wired network, a wireless network, or a combination of wired and wireless networks.

As shown in FIG. 1, the client terminals 150 may be, for example, a personal computer 150a, an moving image output device 150b, and an audio output device 150c, but the client terminals 150 are not limited thereto. For example, the client terminal 150 may be computing apparatuses such as a workstation, a net book, a personal digital assistant (PDA), a portable phone terminal, a smart phone, a portable game player, a portable audio player, or the like. The client terminal 150 may be any kind of information terminal or devices that can receive content data having given file format and/or content data having given streaming format distributable from the content distribution server 110 via the network 102, and the client terminal 150 can be devised to replay such content. The replay can be conducted by receiving and playing live content, or playing content recorded in advance, but not limited thereto. In this disclosure, "play" and "replay" may be interchangeably used with a same or similar meaning such as playing a live content, replaying a content recorded in the past.

The content distribution server 110 can be connected to a content database (DB) 130, and the content distribution server 110 manages content distributable to the client terminals 150a, 150b, and 150c. Such content may not be limited to any specific data. Content data may be text, still photo, audio/sound (hereinafter "audio" may include "sound"), moving image, text data corresponding to audio information such as text information of voice sound, and metadata, or multi-media content including one or more of such information. Hereinafter, such text, still photo, audio, moving image, text information of voice sound, and metadata or the like may be referred to as sub-content element. The sub-content element is discrete content that can be replayed by itself, and a plurality of sub-content element can be integrated as multimedia content such as movie content, which may be composed at least moving image data and audio data.

In general, client terminals available on the market are not adaptable to replay various types of content. For example, one client terminal can replay only audio, other client terminal can replay only text, and other client terminals can only replay audio and moving images. Accordingly, each of the client terminals 150 may not replay all of sub-content element. The content distribution server 110 can distribute content to each client terminal by referencing a replaying system or environment of each client terminal.

Specifically, when one client terminal requests a replay to the content distribution server 110, the content distribution server 110 determines whether the particular content requested by the concerned terminal can be replayed at the concerned terminal. Further, if the content requested by the concerned terminal is composed of a plurality of sub-content elements, the content distribution server 110 may decompose or separate the content into each of its sub-content elements, as required, and then the content distribution server 110 distributes one or more sub-content elements to the concerned terminal so that one or more sub-content elements can be replayed at the concerned terminal.

Hereinafter, for simplicity of expression, content that a user requests to replay may be referred to as "target content." Such target content may be composed of one or more sub-content elements. Each sub-content element may be also referred to as "discrete content," which means that such sub-content element may not be further decomposed or separated because if the sub-content element is decomposed into data composing the sub-content element, such data cannot be replayed at a terminal device.

The content may not be limited to the above examples, and may include web pages, document/presentation/spread sheets prepared by using Office software, drawings prepared by graphic software, document file using portable document format (PDF), video file using video codec such as Moving Picture Experts Group (MPEG)-1, MPEG-2, H.264/MPEG-4 Advanced Video Coding (AVC), and Audio Video Interleave (AVI), QuickTime Movie (MOV), Flash Video, audio file using audio codec such as RIFF Waveform Audio Format (WAV), MPEG-1 AudioLayer-3 (MP3), Windows (registered trademark) Media Audio (WMA), and image file using image file format such as bitmap (BMP), graphics interchange format (GIF), joint photographic experts group (JPEG), JPEG 2000, or the like, but not limited thereto.

The content distribution server 110 reads one or more software programs stored in a storage or storage unit such as a hard disk drive, a non-volatile random access memory (NVRAM), a secure digital (SD) card, or the like, and loads the software programs on a memory area of a random access memory (RAM) to implement functions and processing, to be described later, using a suitable operating system (OS). The content distribution server 110 can activate the operating system using various architecture such as Windows (registered trademark), UNIX (registered trademark), AIX (registered trademark), and LINUX (registered trademark), but not limited thereto.

Further, the client terminal 150, which communicates with the content distribution server 110, can be configured as same as or as similar to the content distribution server 110, and the internal configuration of the client terminal 150 can be changed and/or added, as required, in view of the field of application.

Upon receiving a replay request from the client terminal 150, the content distribution server 110 compares the discrete content to be required to replay, and the capabilities of the client terminal 150. Based on a comparison result, the content distribution server 110 can determine how to decompose or separate one target content into the discrete content matching to a user's request, and then distributes the discrete content matching to the user's request to the client terminal 150. Further, if the same content is to be output to two or more client terminals 150, the content distribution server 110 may conduct a synchronized replay for such content.

A description is given of operation of the content distribution system 100 according to an example embodiment with reference to FIG. 2, which is a block diagram of the content distribution system 100. As shown in FIG. 2, the content distribution server 110 includes, for example, a communication unit 112, a capability information obtaining unit 114, a content distribution unit 116, a comparing unit 118, an element extraction unit 120, a content output determination unit 122, a content decomposer unit 124, a content database (DB) 130, a reporting unit 126, and a synchronization replay unit 128. In FIG. 2, the content DB 130 is disposed in the content distribution server 110. However, the content DB 130 can be disposed at a server disposed separately from the content distribution server 110. The communication unit 112 can be connected to the network 102 using an interface such as a network adaptor, and controls communication with other apparatuses such as client terminal 150.

The capability information obtaining unit 114 obtains information of the capabilities provided for each terminal such as client terminal 150 that requests a replay of content. Such capability information may be referred to as terminal capability information.

The element extraction unit 120 obtains a target content, which is requested by the client terminal 150 to replay, from the content DB 130, and identifies and extracts the discrete content included in the target content. The content DB 130 can be used as a content storage unit.

The comparing unit 118 determines whether the discrete content is playable by the concerned terminal based on the terminal capability information obtained from the capability information obtaining unit 114. Specifically, the comparing unit 118 compares the content playable by the concerned terminal and the discrete content extracted by the element extraction unit 120 to determine whether the currently requested content can be replayed at the concerned terminal.

The discrete content that can be replayed at the client terminal 150 can be determined by referencing relational information correlating the capabilities specified in the terminal capability information and discrete content related to each capability. The relational information may be described by file extension that the client terminal 150 can use, codec installed in the client terminal 150, or information of device includable in the client terminal 150 or connectable to the client terminal 150 alone or in combination.

Upon receiving a designation of the discrete content that the client terminal 150 requests to replay, the content output determination unit 122 determines whether the requested discrete content can be replayed at the request-issuing client terminal, and also determines whether the separating of target content is required. Specifically, the content output determination unit 122 determines whether the entire target content can be distributed to one client terminal without separating the entire target content, whether the entire target content needs to be separated into sub-content elements or discrete content, and how to separate the entire target content if the entire target content needs to be separated.

Further, in response to a content-replaying request from the client terminal 150, the content output determination unit 122 can register the requested discrete content by linking the requested discrete content to the client terminal 150, by which the requested discrete content can be re-used at a given timing later. For example, when the same client terminal 150 issues the same content-replaying request again, the content output determination unit 122 can obtain the registered discrete content linked to the client terminals 150, and can use the registered information of discrete content for the above-described determination process except if a specific instruction is instructed by the client terminals 150.

The content decomposer unit 124 can separates or decomposes one content such as target content and converts to a unit content, which is referred to as discrete content when the content output determination unit 122 determines that the target content needs to be separated into a plurality of discrete content.

Further, the unit content referred to as the discrete content separated by the content decomposer unit 124 can be linked and stored for the client terminal 150. When the client terminal 150 issues a request of replay of the same content again, and the same discrete content is required, instead of conducting the separating process by the content decomposer unit 124, the content output determination unit 122 reads out the stored discrete content, which is referred to as a separated content, and can distribute such stored discrete content to the client terminal 150 which is to replay such discrete content.

Further, upon receiving a request from the content output determination unit 122, the content decomposer unit 124 can read out the stored discrete content, and can transfer such stored discrete content to the client terminal 150. With such a configuration, the processing load level at the content distribution server 110 can be reduced.

The content distribution unit 116 distributes the target content without separating the content or discrete content to the client terminal 150 that has requested a replay of the target content.

When the content output determination unit 122 determines that the requested discrete content cannot be replayed by the request-issuing client terminal 150, the reporting unit 126 reports the client terminal 150 that the requested discrete content cannot be replayed at the client terminal 150.

Further, the synchronization replay unit 128 can monitor and synchronize the content replay status at a plurality of client terminals 150 to adjust the replay progressing of the same content distributed to the plurality of client terminals 150. For example, if one client terminal 150 (process-advancing terminal) is replaying the same discrete content faster than other client terminal 150 (process-delaying terminal), the synchronization replay unit 128 adjusts the replay progressing of the process-advancing terminal so that the content replay processing can be matched between the plurality of client terminals 150, by which the same discrete content can be replayed at each of the client terminals 150 at a synchronized timing.

Further, if the client terminal 150 is added as an output destination terminal after the content replay has started (dynamic adding of device), a time lag may occur between the added client terminal and other client terminal that has already started the replay of the same content. The synchronization replay unit 128 can adjust the replay progressing at the process-advancing terminal, which is advancing compared to the process-delaying terminal. As such, the synchronization replay unit 128 can control the replay of content in view of the replay progressing status at one or more client terminals replaying the content with an advanced timing.

In the above described configuration, the replay request of content is issued from the client terminal 150. In another configuration, a client terminal other than the client terminal 150 can request the replay of discrete content at one or more of client terminals.

Further, in another configuration, the content distribution server 110 can be provided with a format conversion unit to conduct a format conversion process. As for the content distribution server 110, the format conversion unit can be disposed separately, or can be integrated to the content decomposer unit 124. The format conversion unit can adjust data format in view of capabilities of each client terminal. For example, the format conversion unit can be used to adjust a data format to a resolution level that can be displayed at each client terminal, types of colors that can be displayed at each client terminal, and a frequency range of a speaker playable at each client terminal.

A description is given of the client terminal 150. Each of the client terminals 150a and 150b shown in FIG. 2 may include a communication unit 152 (152a, 152b), a content requesting unit 154 (154a, 154b), a capability information provider 156 (156a, 156b), a content receiving unit 158 (158a, 158b), and a content replay unit 160 (160a, 160b).

The communication unit 152 can be connected to the network 102 via an interface such as a network adaptor, and controls communication with the content distribution server 110 and other external apparatuses.

The content requesting unit 154 transmits identification information used for identifying content to the content distribution server 110 as a parameter to request the replay of content. Such identification information designates a target content and sub-content element or discrete content requested to replay.

The identification information of content may be content name, content identifier to identify content by using a content management system, address of the content storing area, or the like. The address of content storing area may be specified by uniform resource identifier (URI) such as uniform resource locator (URL), uniform resource name (URN), or the like.

In response to a request from the content distribution server 110, the capability information provider 156 reads out the descriptor specifying capabilities equipped to the concerned client terminal 150, and transmits the terminal capability information specifying the concerned capabilities to the content distribution server 110. To be described later, the terminal capability information may include file extensions that the client terminal 150 can replay, codec installed in the client terminal 150, or information of devices includable in the client terminal 150 or connectable to the client terminal 150 alone or in combination. The content receiving unit 158 receives the content distributed from the content distribution server 110.

The content replay unit 160 replays the received content requested by a user of client terminal 150, wherein such content may be a target content or discrete content. If the client terminal 150 is equipped capabilities to replay the entire target content, the content can be replayed at the client terminal 150 without dividing or separating the content. If the client terminal 150 is not equipped capabilities to replay the entire target content, the target content may be decomposed or separated into the discrete content in view of capabilities equipped to the client terminal 150.

Further, the content replay unit 160 maintains current replay status as a parameter for conducting the synchronized replaying process. In response to a request from the content distribution server 110, the content replay unit 160 provides the replay status information specifying the current replay status. The replay status information includes, for example, an elapsing time from the start of replay of content, but not limited thereto. Typically, such status data has small amount of data, and thereby a transfer time of such status data between apparatuses or terminals may be negligible compared to the time to process the content.

Figure 4A:
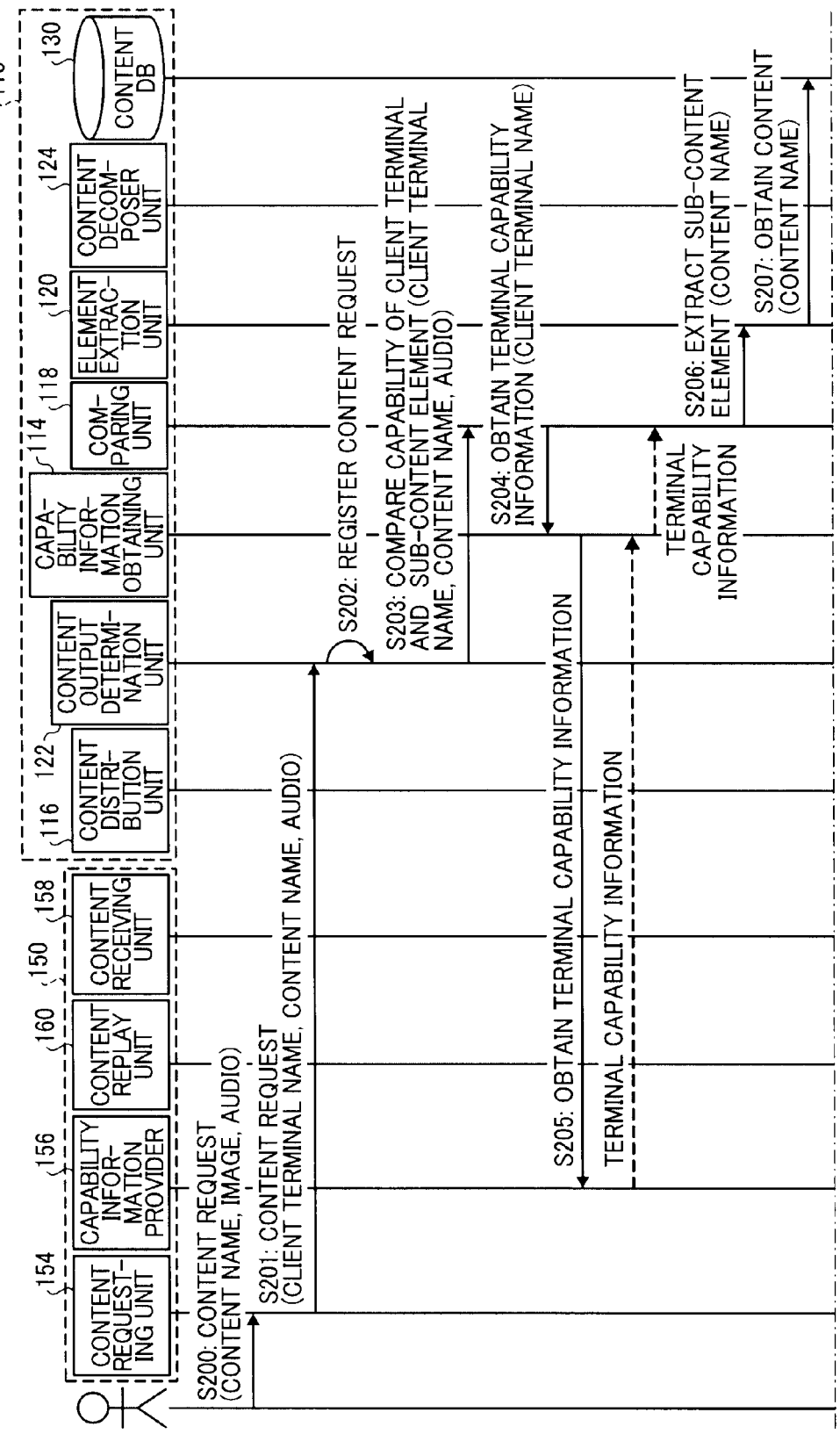
FIGS. 4A and 4B show another example sequential chart of content distribution processing according to an example embodiment, in which it is determined that a separation of content is required.
Figure 4B:
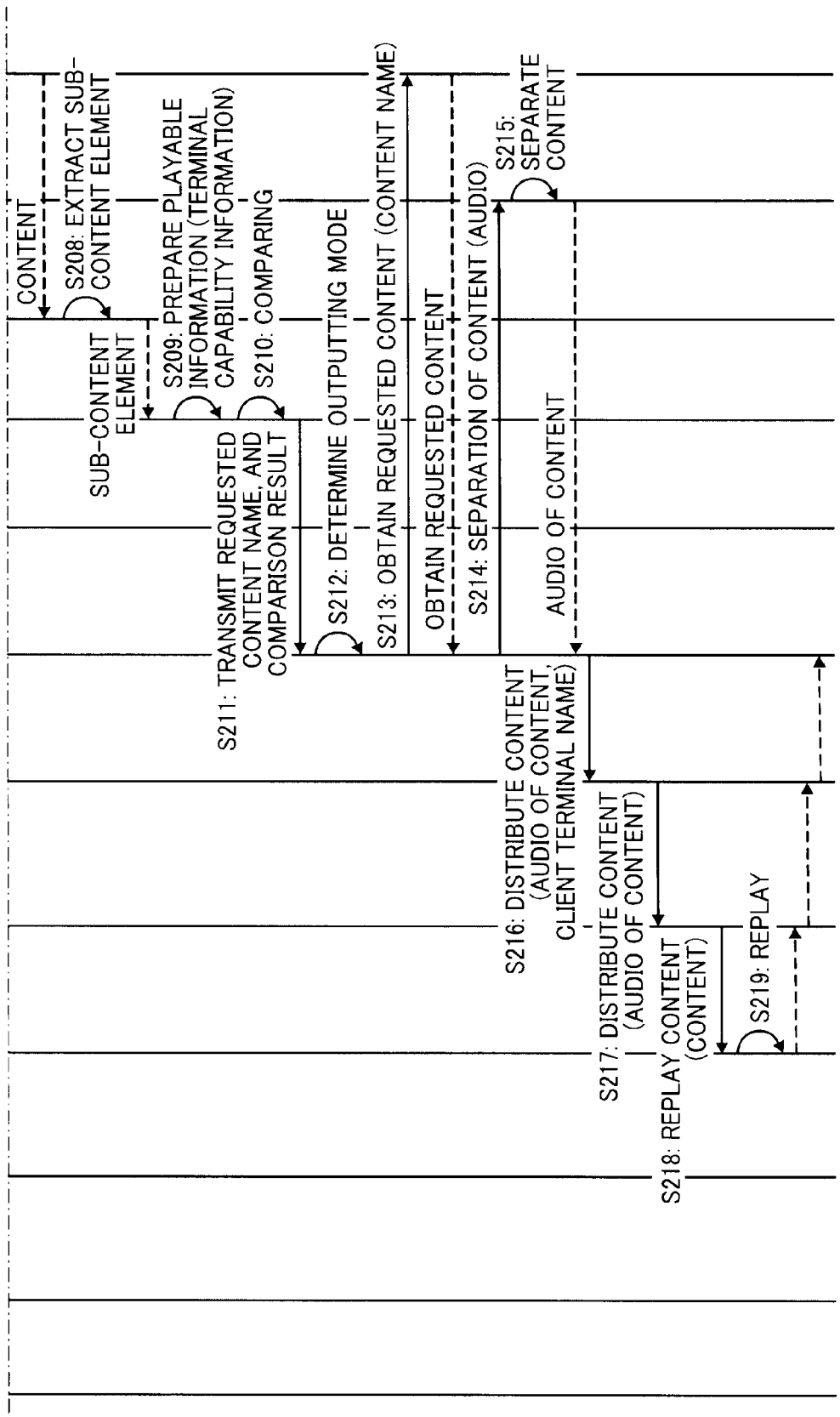

A description is given of content distribution processing according to an example embodiment with reference to FIGS. 3A/3B, and FIGS. 4A/4B, which show sequences of content distribution processing. FIGS. 3A/3B show a case when it is determined that the separation of content is not required, and FIGS. 4A/4B show a case when it is determined that the separating of content is required.

In FIGS. 3A/3B, when a user of the client terminal 150 instructs the replay of content stored in the content DB 130 via a user interface while the application of content replay is activated, the process starts from step S100. The user of the client terminal 150 can designate content that the user wants to replay, wherein such content may be referred to as a target content and/or sub-content element (or discrete content) that a user wants to replay using his or her terminal. In a case of FIGS. 3A/3B, the replay of moving image and audio are designated as the sub-content element.

At step S101, in response to an instruction input by the user, the content requesting unit 154 issues a content request or content-use request to the content distribution server 110. The content request may include parameters such as identification information for identifying a request-issuing client terminal, identification information for identifying the content that the user wants to replay, and identification information for identifying the sub-content element or discrete content that the user wants to replay. In a case of FIGS. 3A/3B, the client terminal name and the content name are used to designate the content request.

At step S102, upon receiving the content request, the content output determination unit 122 of the content distribution server 110 registers information of the request-issuing client terminal 150, the requested target content name, and requested sub-content element to a storage area such as a memory, a hard disk drive (HDD) or the like. FIG. 5A shows structure of data used for requesting the replay (replay requesting data), and registered by the content output determination unit 122. As shown in FIG. 5A, such replay request data registers information for identifying the client terminal (client terminal name, IP address, or the like), the requested target content name, and the requested sub-content element, and the replay request data is registered by the content output determination unit 122 as a record information.

At step S103, the content output determination unit 122 instructs the comparing unit 118 to compare the capabilities of the request-issuing client terminal 150 and information of sub-content element included in the requested target content.

At step S104, the comparing unit 118 transmits the client terminal name of the request-issuing client terminal 150 as a parameter to the capability information obtaining unit 114, and instructs the capability information obtaining unit 114 to obtain the terminal capability information of the request-issuing client terminal 150.

At step S105, the capability information obtaining unit 114 requests the request-issuing client terminal 150 to provide the terminal capability information of the request-issuing client terminal 150 via the communication unit 112. In response to such request, the capability information provider 156 of the request-issuing client terminal 150 provides the terminal capability information of the request-issuing client terminal 150 to the content distribution server 110 via the communication unit 152.

FIGS. 5B, 5C, and 5D show example data structure of terminal capability information of the request-issuing client terminal 150. FIG. 5B shows data of file extensions of content that the client terminal 150 can replay. FIG. 5C shows data of codec installed in the client terminal 150. FIG. 5D shows data or information of devices such as types of devices includable in the client terminal 150 or connectable to the client terminal 150.

At step S106, the comparing unit 118 transmits the content name of requested target content (e.g., Sample1.mpg) as a parameter to the element extraction unit 120, and instructs the element extraction unit 120 to extract the sub-content element for the requested target content. At step S107, the element extraction unit 120 obtains the requested target content from the content DB 130.

At step S108, the element extraction unit 120 extracts the sub-content element included in the requested target content obtained from the content DB 130. The sub-content element included in the obtained content can be determined based on information of file extensions using a table shown in FIG. 6 to be described later. Further, as for the web pages, by analyzing the content file, the sub-content element can be extracted from the link configuration.

At step S109, the comparing unit 118, which has received the terminal capability information of the request-issuing client terminal 150 from the capability information obtaining unit 114, checks the sub-content element included in the content by referencing a relational table shown in FIG. 6. The relational table indicates relationship between the capabilities specified in the terminal capability information and the sub-content element related to each capability.

FIG. 6 shows an example of the relational table. The relational table includes, for example, information of correlation of data between various types of file extensions, codec, devices, and sub-content element that can be replayed. Specifically, sub-content element corresponding to file extensions, sub-content elements corresponding to data encoded by codec, and sub-content element corresponding to devices are included in the relational table.

For example, in the relational table of FIG. 6, the file extension of "mpg" is related to moving image and audio, which means that the client terminals 150 capable of replaying a file having the file extension of "mpg" can replay the moving image and audio. Further, the codec of "MPEG-1 Audio Layer 3" is related to audio, and the device of "Video Projector Device" is related to moving image.

The comparing unit 118 compares information of the terminal capability information shown in FIGS. 5B to 5D and information of the relational table (FIG. 6) to prepare playable information, which specifies the sub-content element that the request-issuing client terminal 150 can replay as information used for comparing.

Figure 7:
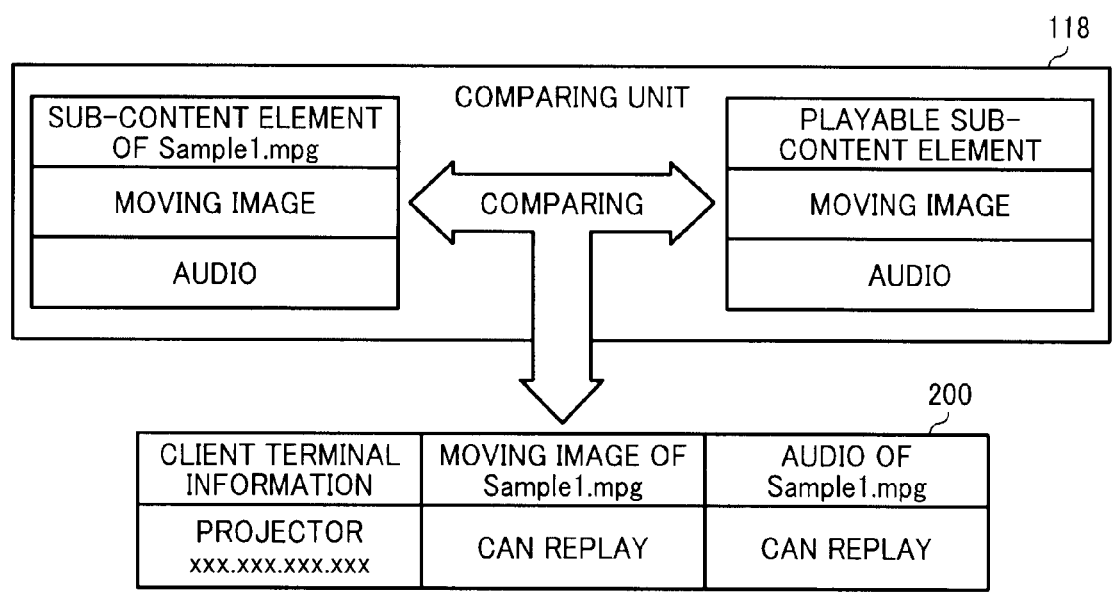
FIG. 7 shows a comparison process by a comparing unit, in which playable information specifying playable content at a terminal device and content extracted from a target content are compared.

At step S110, the comparing unit 118 receives information of the sub-content element from the element extraction unit 120, and compares the playable information obtained at step S109 and the extracted sub-content element to prepare a comparison result. FIG. 7 shows a comparing process by the comparing unit 118, in which the playable information specifying playable sub-content element at the concerned terminal and the sub-content element extracted from the content are compared. As shown in FIG. 7, the comparing unit 118 determines whether each of sub-content elements in the content data can be replayed by the request-issuing client terminal 150, and prepares a comparison result 200.

As such, the comparison unit 118 identifies a sub-content element that can be used at the terminal device based on the capability information, and compares the identified sub-content element based on the capability information and the extracted sub-content element to determine which sub-content element can be used at the terminal device. At step S111, the comparing unit 118 transmits the requested target content name and the comparison result 200 obtained at step S110 to the content output determination unit 122.

At step S112, the content output determination unit 122 determines an outputting mode based on the received comparison result 200 and the replay request data registered at step S102. The content output determination unit 122 determines whether the requested sub-content element can be replayed at the request-issuing client terminal 150, and determines whether it is required to separate into sub-content elements when distributing the content to the request-issuing client terminal 150. The detail of content output determination unit 122 will be explained later.

FIGS. 3A/3B show a case that the content output determination unit 122 determines that it is not required to separate the requested target content into sub-content elements.

When the separation of content is not required, the content output determination unit 122 obtains the requested target content from the content DB 130 at step S113. Then, at step S114, the content output determination unit 122 instructs the content distribution unit 116 to distribute the requested target content using the content name and client name as parameters.

At step S115, the content distribution unit 116 distributes the received content to the request-issuing client terminal 150. Upon receiving the content, the content receiving unit 158 of the client terminal 150 transmits the received content to the content replay unit 160 at step S116, and instructs the content replay unit 160 to replay the received content. At step S117, the content replay unit 160 starts to replay the content.

FIGS. 4A/4B show a case when it is determined that the separation of content is required. Similar to FIGS. 3A/3B, in a case of FIGS. 4A/4B, when a user of the client terminal 150 instructs the replay of content stored in the content DB 130 via a user interface, the process starts from step S200. In FIGS. 4A/4B, the replay of audio-only is designated as the sub-content element.

At step S201, in response to an instruction input by the user, the content requesting unit 154 issues a content request or content-use request to the content distribution server 110.

At step S202, upon receiving the content request, the content output determination unit 122 of the content distribution server 110 registers information of the request-issuing client terminal 150, the requested target content name, and the requested sub-content element to a storage area such as a memory, a HDD or the like. FIG. 5A shows an example structure of data used for requesting the replay (replay requesting data), and registered by the content output determination unit 122.

At step S203, the content output determination unit 122 instructs the comparing unit 118 to compare the capabilities of the request-issuing client terminal 150 and information of sub-content element included in the requested target content.

At step S204, the comparing unit 118 transmits the client terminal name of the request-issuing client terminal 150 as a parameter to the capability information obtaining unit 114, and instructs the capability information obtaining unit 114 to obtain the terminal capability information of the request-issuing client terminal 150. FIGS. 5B to 5D show examples of the terminal capability information of the request-issuing client terminal 150.

At step S205, the capability information obtaining unit 114 requests the request-issuing client terminal 150 to provide the terminal capability information via the communication unit 112.

At step S206, the comparing unit 118 transmits the content name of requested target content (e.g., Sample1.mpg) as a parameter to the element extraction unit 120, and instructs the element extraction unit 120 to extract sub-content element for the requested target content. At step S207, the element extraction unit 120 obtains the requested target content from the content DB 130.

At step S208, the element extraction unit 120 extracts the sub-content element included in the requested target content obtained from the content DB 130.

At step S209, the comparing unit 118, which has received the terminal capability information of the request-issuing client terminal 150 from the capability information obtaining unit 114, checks the sub-content element included in the content by referencing the relational table shown in FIG. 6. The relational table indicates relationship between the capabilities specified in the terminal capability information and the sub-content element related to each capability. The comparing unit 118 compares information of the terminal capability information shown in FIGS. 5B to 5D and information of the relational table (FIG. 6) to prepare playable information, which specifies the sub-content element that the request-issuing client terminal 150 can replay as comparing purpose information.

At step S210, the comparing unit 118 receives information of the sub-content element from the element extraction unit 120, and compares the playable information obtained at step S209 and the extracted sub-content element to prepare a comparison result.

As such, the comparison unit 118 identifies a sub-content element that can be used at the terminal device based on the capability information, and compares the identified sub-content element based on the capability information and the extracted sub-content element to determine which sub-content element can be used at the terminal device.

At step S211, the comparing unit 118 transmits the requested target content name and the comparison result obtained at step S210 to the content output determination unit 122.

At step S212, the content output determination unit 122 determines an outputting mode based on the received comparison result and the replay request data registered at step S202. FIGS. 4A/4B show a case that the content output determination unit 122 determines that it is required to separate the target content into sub-content elements.

When the separation of content is required, the content output determination unit 122 obtains the requested target content from the content DB 130 at step S213. Then, at step S214, the content output determination unit 122 transmits the obtained target requested content to the content decomposer unit 124, and instructs the content decomposer unit 124 to decompose or separate the content into the sub-content element.

At step S215, the content decomposer unit 124 decomposes or separates the target content into sub-content elements and prepares only a required sub-content element and returns the prepared sub-content element to the content output determination unit 122. In a case of FIGS. 4A/4B, only the audio content is replayed.

At step S216, the content output determination unit 122 instructs the content distribution unit 116 to distribute the content such as prepared sub-content element using the target content name and the client name as parameters. At step S217, the content distribution unit 116 distributes the received content such as prepared sub-content element to the request-issuing client terminal 150.

At step S218, upon receiving the content such as prepared sub-content element, the content receiving unit 158 of the client terminals 150 transmits the received content to the content replay unit 160 and instructs the content replay unit 160 to replay the received content. At step S219, the content replay unit 160 starts to replay the content, in which only the audio content is replayed in a case of FIGS. 4A/4B.

Further, when the same content is replayed at a plurality of client terminals 150 disposed as one group, the replay status of content needs to be synchronized among the plurality of client terminals 150. The content replay unit 160 can monitor and store the replay status at each client terminal 150. Upon receiving a request from the content distribution server 110, the content replay unit 160 in each client terminal 150 can provide the replay status information of each client terminals 150.

The synchronization replay unit 128 can obtain the replay status information from each client terminal 150, and compares the replay status between different client terminals. Based on such comparison such as difference of replay status between the different client terminals, a synchronized replaying processing by the plurality of client terminals 150 can be conducted by slowing data transmission speed to a process-advancing terminal; by shifting a replay position for some terminals; by slowing the replay speed for some terminals, or the like.

Figure 8:
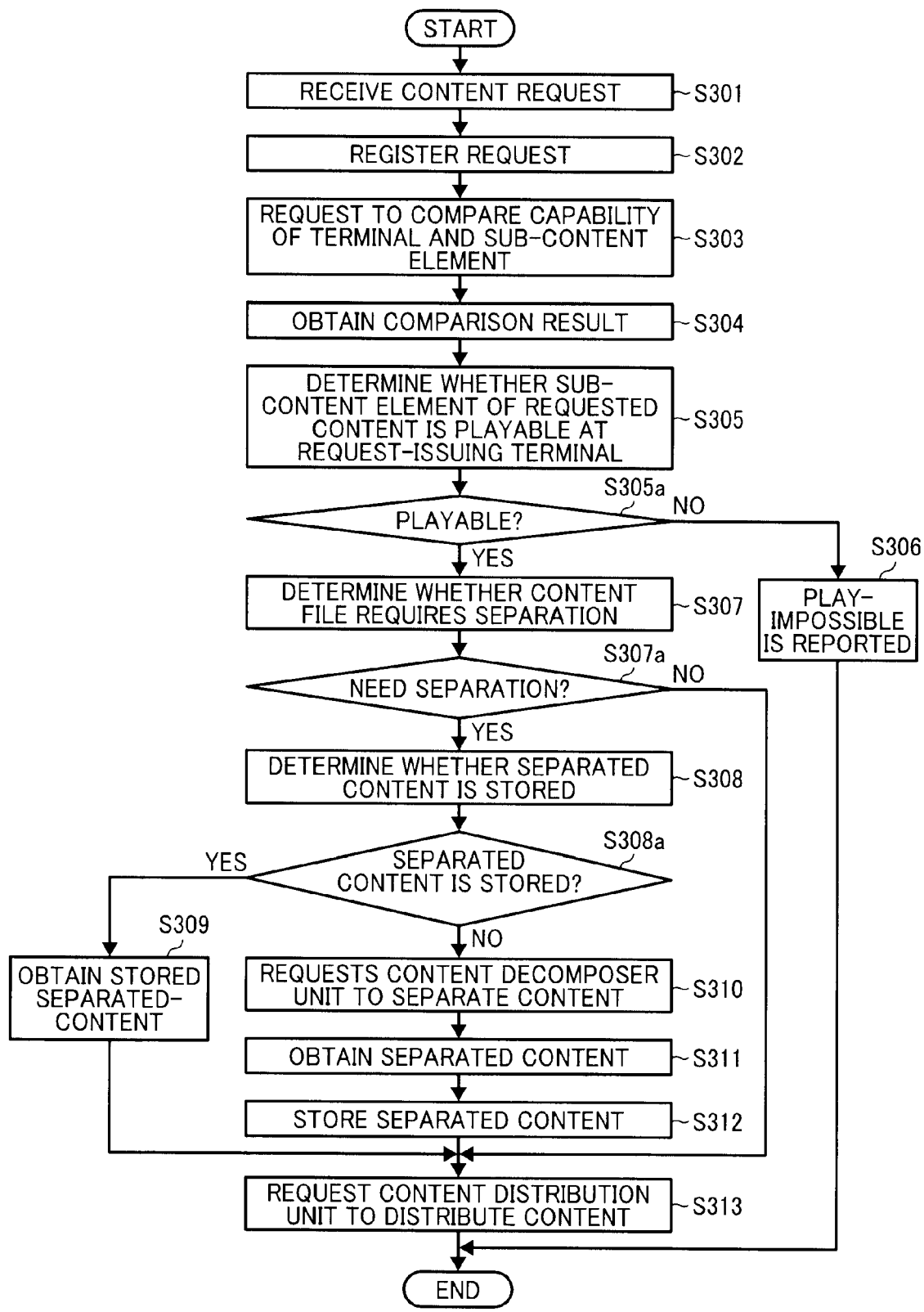
FIG. 8 shows a flowchart of steps of a content output determination process by a content distribution server according to an example embodiment.

A description is given of content output determination processing conduce-table by the content output determination unit 122. FIG. 8 shows a flowchart of steps of a content output determination processing conduct-able by a content distribution server according to an example embodiment.

At step S301, the content output determination unit 122 receives a content request issued by the client terminal 150, and obtains information designating a request-issuing client terminal, information designating the target content that is requested to replay, and information of the sub-content element that is requested to replay.

At step S302, the content output determination unit 122 registers the information of request-issuing client terminal, the requested target content, and the requested sub-content element as replay request data.

At step S303, the content output determination unit 122 requests the comparing unit 118 to compare the capabilities of the client terminal 150 and the requested sub-content element. At step S304, the content output determination unit 122 obtains a comparison result such as comparison result 200 shown in FIG. 7.

Figure 10:
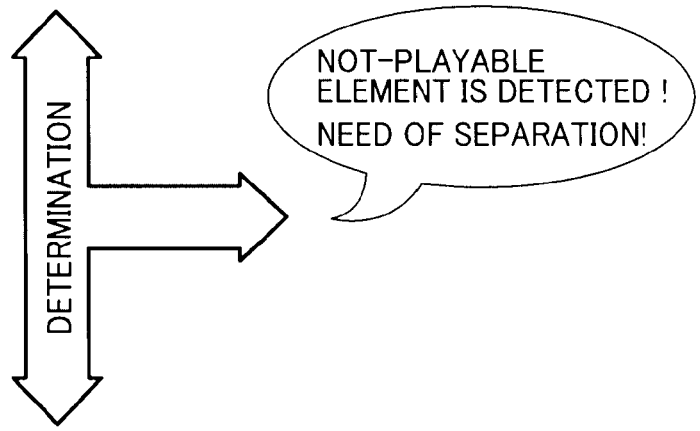
FIG. 10 shows another example of determination result determined by a content output determination unit according to an example embodiment.

At steps S305/S305a, the content output determination unit 122 determines whether the sub-content element in the requested target content is playable at the request-issuing client terminal 150. FIGS. 9A, 9B, and FIG. 10 show examples of determination result of the content output determination unit 122 at steps S305/S305a.

In a case of FIG. 9A, both of the moving image and audio, which are sub-content elements included in the requested target content, are playable at a client terminal, and thereby the sub-content elements requested by the concerned client terminal are determined as playable.

In a case of FIG. 9B, the requested target content is composed of the sub-content elements of moving image and audio, but the moving image is not playable at a client terminal. However, because the concerned client terminal requests only audio as the sub-content element to replay, the sub-content element requested by the concerned client terminal is determined as playable. As such, the requested sub-content element is determined as playable.

In contrast, in a case of FIG. 10, the requested target content is composed of the sub-content elements of moving image and audio, and a concerned client terminal requests the moving image and audio as the sub-content elements to replay. In this case, the audio is not playable at the concerned client terminal while the concerned client terminal requests the replay of both of the moving image and audio. Because the audio is determined as not playable at the concerned client terminal, it is determined that not all of the requested sub-content elements (i.e., moving image and audio) are playable (i.e., some are playable, and some are not playable) at the concerned client terminal.

Figure 11A:
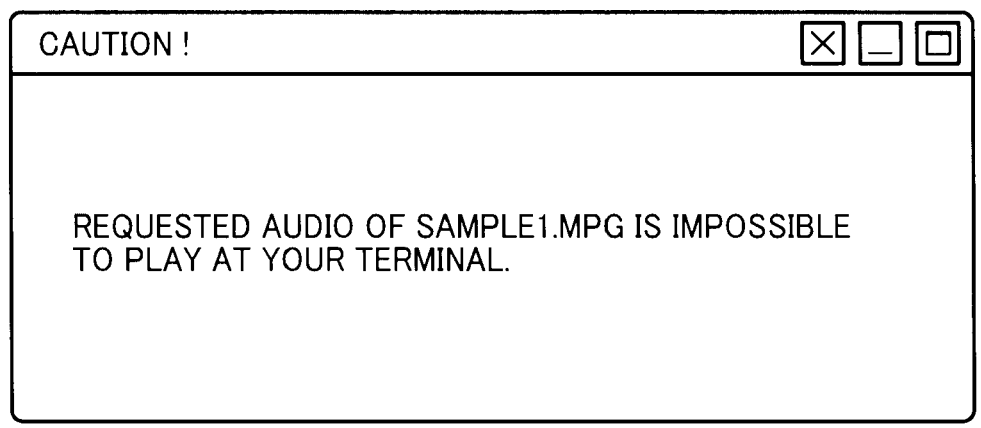
FIGS. 11A and 11B show examples of error messages reported to a client terminal from a reporting unit, in which the error messages report replay is impossible.
Figure 11B:
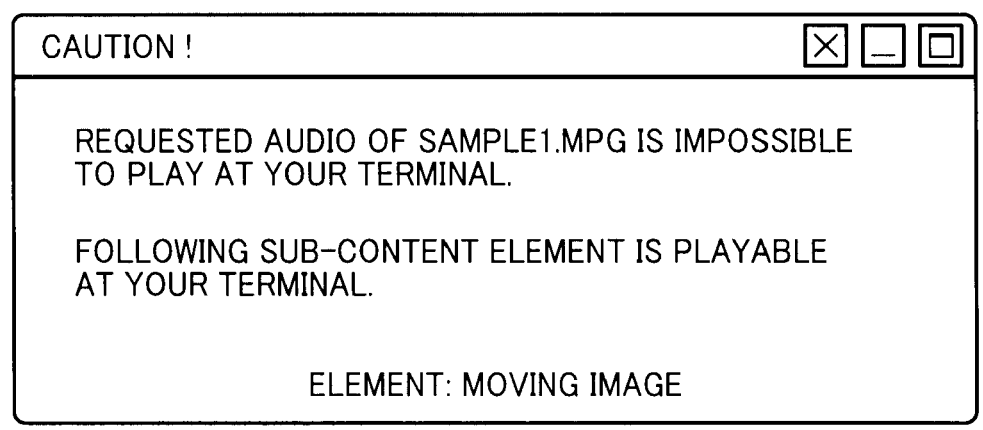

As shown in a case of FIG. 10, if it is determined that not all of the requested sub-content elements is playable (S305a: No), the process proceeds to step S306. At step S306, an error message indicating that the play-impossible is reported as shown in FIGS. 11A and 11B, and the process ends at step S314. In this example case, the error message can be reported as such. In other configuration, not-playable sub-content element can be modified to sub-content element playable at a client terminal.

Further, if a sub-content element determined as not-playable is included in the requested sub-content element, such not-playable sub-content element can be deleted or disregarded. In a case of FIG. 10, because the replay of audio cannot be conducted at the client terminal, the sub-content element of audio can be deleted from the requested sub-content element, and then the process proceeds to step S307.

In contrast, if it is determined that the requested sub-content element is determined as playable (S305a: Yes), the process proceeds to step S307.

At step S307, it is determined whether the target content file needs to be separated. Specifically, if it is determined that all of sub-content elements included in the requested target content match to all of sub-content elements playable at the concerned apparatus or device, the requested target content file is not required to be separated.

In contrast, if it is determined that the sub-content element included in the requested target content partially matches to the sub-content element playable at the concerned apparatus or device, the target content file is required to be separated.

In a case of FIG. 9A, the sub-content elements of audio and moving image included in the content "Sample1.mpg" are both playable at a client terminal, and thereby it is determined that the separation of content is not required. In a case of FIG. 9B, the sub-content element of moving image included in the content "Sample1.mpg" is not playable at a client terminal, and thereby it is determined that the separation of content is required. In a case of FIG. 10, the sub-content element of audio included in the content "Sample1.mpg" is not playable at a client terminal. In this case, it can be determined that the separation of content is required if an error message is not reported and a correction process such as deleting the not-playable content is conducted.

If it is determined that the separation of content is not required (step S307a: No), the process proceeds to step S313. At step S313, the content distribution without separation of content is requested to the content distribution unit 116.

In contrast, if it is determined that the separation of content is required (step S307a: Yes), the process proceeds to steps S308/S308a.

At steps S308/S308a, it is determined whether the separated content is already stored by linking the separated content and the concerned client terminal in the past, wherein such linking and storing of content may be conducted when a content request was requested in the past. With such a determination process, if the same client terminal requested a replay of the same sub-content element of the same content in the past, the separating process of content for the current processing that is requesting a replay of content can be omitted, by which the processing load for the current processing can be reduced.

If it is determined that the same separated content is already stored (S308a: Yes), the process proceeds to step S309. At step S309, the stored separated-content is obtained without requesting the separating process at the content decomposer unit 124. Then, at step S313, the content distribution unit 116 is requested to conduct the content distribution of sub-content element, and the process ends.

In contrast, if it is determined that separated-content is not stored (step S308a: No), the process proceeds to step S310. At step S310, the content output determination unit 122 requests the content decomposer unit 124 to separate the target content to each sub-content element as separated content. At step S311, the separated sub-content element is obtained. At step S312, the separated sub-content element is stored while linked to the client terminals 150, the requested target content, and the requested sub-content element. Then, at step S313, each separated sub-content element included in the target content can be distributed to a concerned client terminal, and the process ends at step S314.

Figure 12A:
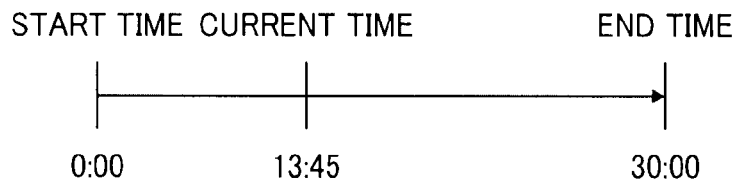
FIGS. 12A and 12B show a synchronized replay by a synchronization replay unit according to an example embodiment.

A description is given of the synchronized replay processing for the content distribution processing system using a plurality of client terminals with reference to FIGS. 12A/12B. As described above, the synchronization replay unit 128 conducts the synchronized replay processing for a plurality of client terminals by monitoring the content replay status at the plurality of client terminals to synchronize the replay of the same content using different client terminals.

FIGS. 12A/12B show a schematic processing for synchronized replay using a plurality of client terminals 150. FIG. 12A shows information of time line from the start of content replay, in which information of start time, current time, and end time can be detected and stored, and an elapsed time from the start time can be computed. The content distribution server 110 can obtain such time information from each client terminal as the replay status information indicating the replay status at each client terminal.

Figure 12B:
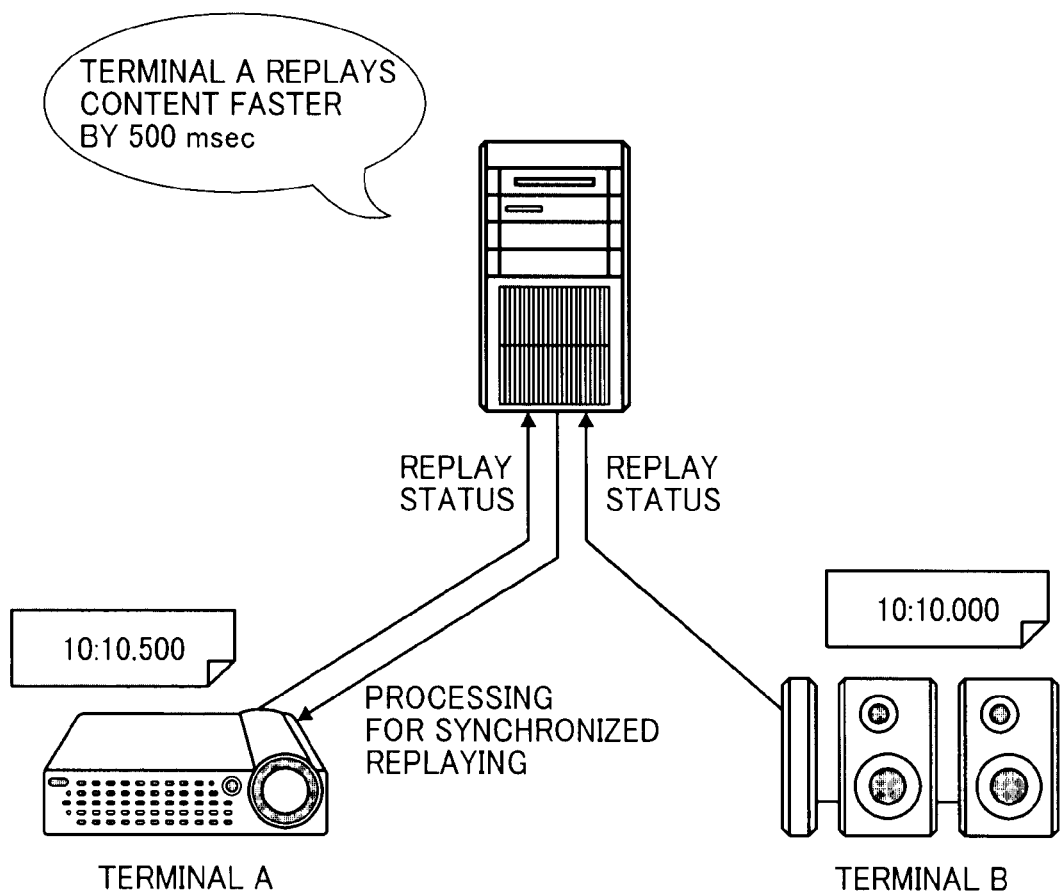

FIG. 12B shows a schematic replay processing environment of the same content using a plurality of client terminals 150, in which the content distribution server 110 obtains the replay status information from each client terminal replaying the same content. In FIG. 12B, a terminal A replays the content faster than a terminal B, and thereby the replay processing at the terminal A (process-advanced terminal) is adjusted to the replay processing at the terminal B (process-delayed terminal) using the content distribution server 110. Specifically, the content distribution server 110 compares the replay status information obtained from the terminals A and B to determine which client terminal is advancing for replaying, and determines whether the difference of processing speed occurs between the terminals A and B.

In FIG. 12B, the terminal A is replaying the content faster than the terminal B by 500 msec (milliseconds). In such a situation, the synchronization replay unit 128 of the content distribution server 110 instructs the content distribution unit 116 to delay the data transfer to the terminal A based on the processing time difference between the terminals A and B. As such, based on the processing time difference, the data transmission to the process-advanced terminal (i.e., terminal A) is delayed to configure the synchronized replaying of content between the terminals A and B.

The content replay can be conducted in various types of environment. For example, the same content can be replayed at the same time for a plurality of client terminals that can replay the content, or the same content can be replayed only in one meeting room used by a limited number of meeting participants, but not limited these.

Further, the synchronization replay unit 128 can manage following situation. When one content is being replayed for one group (e.g., group A) using client terminals, other group (e.g., group B) may join the group A after replaying the one content for some time for the group A. In such a case, the client terminals in the group A have already replayed the content for some time, and then the client terminals in the participant group B join the replay of the content.

In such a situation, the synchronization replay unit 128 assigns the replay status designation information specifying the replay status in the group A to the distributed content. Based on such replay status designation information, the synchronization replay unit 128 instructs the client terminals in the group B to start the replay of the same content from a given data position, or the synchronization replay unit 128 conducts data transmission to the client terminals in the group B from the data position corresponding to the replay status in the group A. As such, one or more client terminals can be dynamically added to a system that is replaying the content.

As described above, in the configuration according to an example embodiment, the content stored in a server can be replayed using a plurality of client terminals. For example, as for multi-media content (e.g., movie content) composed of a plurality of sub-content elements, each sub-content element can be output to each client terminal. If one content is composed of the sub-content elements of moving image and audio, the one content can be separated into the sub-content elements of moving image and audio. Then, the moving image is transmitted to one client terminal to output or replay the moving image while the audio is transmitted to other client terminal to output or replay the audio. As such, each of the sub-content elements of one content can be output or replayed using different client terminals, wherein such replay may be called as collaborative output of content.

Further, a client terminal can be added and connected to a content replay environment already replaying the content, and one or more sub-content elements can be output to the added client terminal for replaying. As such, one or more client terminals can be dynamically added as an output destination of content being replayed for some time.

FIG. 13 shows examples of content replay patterns that the content distribution system 100 can conduct, but the replay patterns are not limited there to. As shown in FIG. 13, the movie content can be separated into the sub-content elements of moving images and audio, and the moving image content can be replayed using a projector while the audio content can be replayed using an earphone.

Further, the movie content can be separated into the sub-content elements of still images (e.g., photos) and audio, and the still image (e.g., photos) and audio content can be replayed using a digital photo frame.

Further, the movie content can be separated into the sub-content elements of moving image, audio, and metadata such as such capture information when sub-content elements is captured, and the moving image and audio content can be replayed using a projector while the metadata (e.g., capture information) can be displayed on a display of an apparatus such as a personal computer (PC).

Further, the movie content can be separated into the sub-content elements of moving image and audio. The moving image and audio content can be output or replayed using a projector while the audio content can be output or replayed using a speaker.

Further, the audio content can be separated into the sub-content elements of audio and text-converted audio information, wherein the text-converted audio information is prepared by writing voice information included in audio as text. The audio can be replayed using a music player while the text-converted audio information can be displayed using a smart phone.

Further, a web page can be separated into the sub-content element of still image (e.g., photos) and text. The still image (e.g., photos) and text can be displayed using a terminal not equipped with a browser.

In the above described example embodiment, when a client terminal requests a replay of multi-media content, the requested multi-media content can be separated into the sub-content elements such as moving image, audio, still image, and text depending on an operation environment of each client terminal, and the separated sub-content element can be output to each client terminal. With such a configuration, the sub-content element requested by a user can be selectively distributed to one or more concerned client terminals. The above described configurations according to an example embodiment can be devised as a content distribution system, a content distribution server, a content distribution method, a software program, and a storage medium to store the software program.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example. In the above described embodiment, each unit of device or apparatus can be implemented in hardware or as a combination of hardware/software combination, and each unit can be configured using various types of processors, circuits, or the like such as a programmed processor, a circuit, an application specific integrated circuit (ASIC), used singly or in combination, as required.

As described above, a user can selectively use sub-content elements such as audio/sound, image, moving images, text, or the like included in one content at each client terminal using the above described system configuration. Further, sub-content elements included in one content can be output using a plurality of client terminals, by which collaborative output of content can be devised using the above described system configuration. Further, a client terminal can be added as an output destination of content being replayed for some time using the above described system configuration.

The above described content distribution system, content distribution server, content distribution method, software programs, and storage medium can be used to separate multimedia content, requested by a client terminal to replay, into sub-content elements such as moving image, audio/sound, still image, and text in view of the client terminal environment, and can selectively distribute such sub-content elements, requested by a user, to the client terminal.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A content distribution system, comprising:
   a terminal device; and
   a content distribution server connectable to the terminal device via a network, the content distribution server including circuitry configured to
      obtain capability information specifying one or more capabilities of the terminal device that requests use of a target content media file as a content-use request,
      obtain the requested target content media file from a content storage device and to extract a sub-content element composing the target content media file, the target content media file including a plurality of different types of sub-content elements corresponding to at least two types of media selectable from moving image, audio, still image, and text,
      a comparison unit to identify a sub-content element that can be used at the terminal device based on the capability information, and to compare the identified sub-content element based on the capability information and the extracted sub-content element to determine which sub-content element can be used at the terminal device,
      determine whether separation of the target content media file is required to distribute the sub-content element that can be used at the terminal device to the terminal device, and
      separate the target content media file into each of the sub-content elements, which correspond to the at least two types of media selectable from the moving image, the audio, the still image, and the text, as a separated sub-content element, in response to determining that separation of the target content media file is required.

2. The content distribution system of claim 1, wherein the circuitry is further configured to implement synchronized replay of the same content replayed by a plurality of terminal devices in view of replay status at each of the plurality of terminal devices.

3. The content distribution system of claim 1, wherein the circuitry is further configured to
   store the sub-content element included in the target content media file by linking the sub-content element with the terminal device in response to the content-use request received from the terminal device, and
   determine, when the circuitry later receives a next content-use request of target content media file from the terminal device, whether the target content media file needs to be separated based on reading out and referencing the sub-content element stored and linked to the terminal device.

4. The content distribution system of claim 1, wherein the circuitry is further configured to
   store the separated sub-content element by linking the separated sub-content element to the terminal device, and
   read out, when the circuitry later receives a next content-use request of target content media file from the terminal device, and determines that the same sub-content element is necessary, the separated sub-content element stored and linked to the terminal device without separation of the target content media file.

5. The content distribution system of claim 1, wherein circuitry is further configured to reference relational information correlating the one or more capabilities specified in the capability information, and sub-content elements related to each of the capabilities specified in the capability information, to determine which sub-content element of the target content media file can be used at the terminal device.

6. The content distribution system of claim 1, wherein the capability information is specified by at least one of a file extension that the terminal device can use, a codec installed in the terminal device, and device information of a device includable in the terminal device or connectable to the terminal device.

7. The content distribution system of claim 1, wherein the circuitry is further configured to report, when the circuitry determines that a sub-content element that the terminal device requests to use cannot be used at the terminal device, to the terminal device that the sub-content elements requested by the terminal device cannot be replayed at the terminal device.

8. The content distribution system of claim 1, wherein the circuitry is further configured to distribute the separated sub-content element to the terminal device that has issued the content-use request.

9. The content distribution system of claim 1, wherein the terminal device includes terminal circuitry configured to
   transmit a content-use request of target content media file, managed by the content distribution server, to the content distribution server, the content-use request of the target content media file designating a sub-content element to be used for replay, and
   read out the capability information specifying one or more capabilities of the terminal device and transmit the capability information to the content distribution server.

10. The content distribution system of claim 1, wherein the at least two types of media being selectable from the moving image, the audio, the still image, the text, text-converted audio information, and metadata.

11. The content distribution system of claim 1, wherein the circuitry is further configured to distribute, to the terminal device that has issued the content-use request, out of the sub-content elements, only the separated sub-content element identified as being able to be used at the terminal device.

12. A content distribution server connectable to a terminal device via a network, comprising:
    circuitry configured to
       obtain capability information specifying one or more capabilities of the terminal device that requests use of a target content media file,
       obtain the requested target content media file from a content storage device and to extract a sub-content element composing the target content media file, the target content media file including a plurality of different types of sub-content elements corresponding to at least two types of media selectable from moving image, audio, still image, and text, identify a sub-content element that can be used at the terminal device based on the capability information, and to compare the identified sub-content element based on the capability information and the extracted sub-content element to determine which sub-content element can be used at the terminal device, determine whether a separation of the target content media file is required to distribute the sub-content element that can be used at the terminal device to the terminal device, and separate the target content media file into each of the sub-content elements, which correspond to the at least two types of media selectable from the moving image, the audio, the still image, and the text, as a separated sub-content element, in response to determining that the separation of the target content media file is required.

13. The content distribution server of claim 12, wherein the circuitry is further configured to implement synchronized replay of the same content replayed by a plurality of terminal devices in view of replay status at each of the plurality of terminal devices.

14. The content distribution server of claim 12, wherein the circuitry is further configured to store the sub-content element included in the target content media file by linking the sub-content element with the terminal device in response to a content-use request received from the terminal device, and determine, when the circuitry later receives a next content-use request of target content media file from the terminal device, whether the target content media file needs to be separated based on reading out and referencing the sub-content element stored and linked to the terminal device.

15. The content distribution server of claim 12, wherein the circuitry is further configured to store the separated sub-content element by linking the separated sub-content element to the terminal device, and read out, when the circuitry later receives a next content-use request of target content media file from the terminal device, and determines that the same sub-content element is necessary, the separated sub-content element stored and linked to the terminal device without separation of the target content media file.

16. The content distribution server of claim 12, wherein the circuitry is further configured to reference relational information correlating the one or more capabilities specified in the capability information, and sub-content elements related to each of the capabilities specified in the capability information, to determine which sub-content element of the target content media file can be used at the terminal device.

17. The content distribution server of claim 12, wherein the capability information is specified by at least one of a file extension that the terminal device can use, a codec installed in the terminal device, and device information of a device includable in the terminal device or connectable to the terminal device.

18. The content distribution server of claim 12, wherein the circuitry is further configured to report, when the circuitry determines that a sub-content element that the terminal device requests to use cannot be used at the terminal device, to the terminal device that the sub-content elements requested by the terminal device cannot be replayed at the terminal device.

19. The content distribution server of claim 12, wherein the circuitry is further configured to distribute the separated sub-content element to the terminal device that has issued the content-use request.

20. The content distribution server of claim 12, wherein the terminal device includes terminal circuitry configured to transmit a content-use request of target content media file, managed by the content distribution server, to the content distribution server, the content-use request of the target content media file designating a sub-content element to be used for replay, and read out the capability information specifying one or more capabilities of the terminal device and transmit the capability information to the content distribution server.

21. A non-transitory computer readable medium storing a program for a content distribution method conductable by a content distribution server connectable to a terminal device via a network, the method comprising the steps of:

obtaining capability information specifying one or more capabilities of the terminal device that requests a use of a target content media file;

obtaining the requested target content media file from a content storage device;

extracting a sub-content element composing the target content media file, the target content media file including a plurality of different types of sub-content elements corresponding to at least two types of media selectable from moving image, audio, still image, and text;

identifying a sub-content element that can be used at the terminal device based on the capability information;

comparing the identified sub-content element based on the capability information and the extracted sub-content element to determine which sub-content element can be used at the terminal device;

determining whether separation of the target content media file is required to distribute the sub-content element that can be used at the terminal device to the terminal device; and separating the target content media file into each of the sub-content elements, which correspond to the at least two types of media selectable from the moving image, the audio, the still image, and the text, as a separated sub-content element, in response to determining that separation of the target content media file is required.

* * * * *

UNITED STATES PATENT AND TRADEMARK OFFICE
CERTIFICATE OF CORRECTION

| | | |
|---|---|---|
| PATENT NO. | : 9,264,746 B2 | Page 1 of 1 |
| APPLICATION NO. | : 13/409727 | |
| DATED | : February 16, 2016 | |
| INVENTOR(S) | : Shoh Nagamine et al. | |

It is certified that error appears in the above-identified patent and that said Letters Patent is hereby corrected as shown below:

On the title page, Item (30), the Foreign Application Priority Data Information is incorrect.
Item (30) should read:

--(30)    Foreign Application Priority Data

Mar. 9, 2011 (JP)................................................2011-051747--

Signed and Sealed this
Seventeenth Day of May, 2016

Michelle K. Lee
*Director of the United States Patent and Trademark Office*